United States Patent
Ogihara

[15] 3,707,114
[45] Dec. 26, 1972

[54] AUTOMATIC EXPOSURE CONTROLS FOR ELECTROSTATIC IMAGE CAMERAS

[72] Inventor: Mamoru Ogihara, Suwa-gun, Japan

[73] Assignee: Kabushiki Kaisha Yashika, Tokyo-to, Japan

[22] Filed: June 24, 1970

[21] Appl. No.: 49,423

[30] Foreign Application Priority Data

June 30, 1969 Japan.....................44/62292

[52] U.S. Cl................95/10 CT, 95/53 E, 95/53 EB, 355/3
[51] Int. Cl..............................G03b 7/08
[58] Field of Search....95/53 EB, 53 E, 10 CT; 355/3

[56] References Cited

UNITED STATES PATENTS

| 2,221,776 | 11/1940 | Carlson | 355/3 X |
| 3,245,332 | 4/1966 | Kagan | 95/53 EB |
| 3,092,002 | 6/1963 | Frenk | 95/53 E |

FOREIGN PATENTS OR APPLICATIONS

| 1,385,444 | 12/1964 | France | 355/3 |
| 1,088,859 | 10/1967 | Great Britain | 355/3 |

*Primary Examiner*—Samuel S. Matthews
*Assistant Examiner*—Russell E. Adams, Jr.
*Attorney*—Steinberg & Blake

[57] ABSTRACT

A camera for electrostatically imaging an object on film. A shutter is provided to start the exposure of the film only when the shutter is placed in its open position. The light intensity is automatically sensed and through a timing circuit an oscillating circuit is triggered to its off state after an elapse of time determined by the intensity of the light. Electrically conductive layers between which the film for receiving the electrostatic image is located are electrically connected with a transformer which becomes operative when the shutter opens and which is deenergized when the oscillating circuit is triggered by the timing circuit. This transformer has a portion which acts to release the shutter for return to its closed position when the transformer is deenergized.

5 Claims, 3 Drawing Figures

AUTOMATIC EXPOSURE CONTROLS FOR ELECTROSTATIC IMAGE CAMERAS

BACKGROUND OF THE INVENTION

The present invention relates to cameras.

In particular, the present invention relates to that type of camera which will image an object electrostatically on a film.

Such cameras are known, and they act to transmit an electrostatic charge to a film for achieving an image thereon.

Cameras of this type have as part of the electrostatic imaging structure a photosensitive layer which is fairly delicate. In the event that such a layer is exposed to light of high intensity for a substantial time, this photosensitive layer can become undesirably influenced prior to an actual exposure, with the result that the quality of the exposure is deleteriously influenced. It has been proposed to use suitable shutters to protect the photosensitive layer until an exposure actually is to be made, but the controls of such shutters have not been developed to the required degree of precision in connection with cameras of this type.

SUMMARY OF THE INVENTION

It is accordingly a primary object of the present invention to provide for a camera of this type a shutter and a control therefor which will reliably protect the photosensitive layer so that it will not be undesirably influenced by excessive exposure to intense light.

It is furthermore an object of the invention to provide a construction which will assure a proper exposure of film for a camera of this type.

Also, it is an object of the invention to provide a structure which is fully automatic except for the initial actuation of the structure.

Furthermore it is an object of the invention to provide a construction which will achieve the above objects with a relatively small number of reliably operating components, so that an exceedingly effective exposure control can be achieved at a low cost with the small number of parts.

According to the invention the camera for electrostatically imaging an object includes a shutter means which has an open position and a closed position and which tends to assume its closed position. A manually operable means coacts with the shutter means to displace it to its open position, and a releasable holding means coacts with the shutter means to maintain it in its open position. A control means which responds to the intensity of light coacts with the releasable holding means to actuate the latter to release the shutter means for return to its closed position after an exposure time which will provide a proper exposure on the film which receives the electrostatic image.

BRIEF DESCRIPTION OF DRAWINGS

The invention is illustrated by way of example in the accompanying drawings which form part of this application and in which.

DESCRIPTION OF A PREFERRED EMBODIMENT

Figure 3:
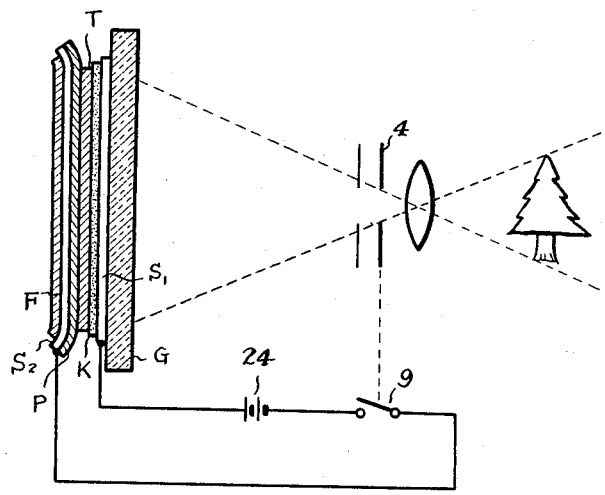
FIG. 3 is a schematic representation of the manner in which an object is electrostatically imaged.

Referring first to FIG. 3, the camera which provides the electrostatic image utilizes a charge-transfer process. The structure shown in FIG. 3 for providing the electrostatic image includes a photosensitive sheet K in the form of selenium and tellurium vacuum-deposited on a transparent electrically-conductive layer $S_1$ which in turn is carried by a clear glass plate G. Opposite to the photosensitive sheet K is a dielectric film in the form of a Mylar film F (polyethylene-polyethylene terephtalate film). At its surface which is directed toward the photosensitive layer K, the film F is coated with an aluminum conductive layer $S_2$, and between the aluminum layer $S_2$ and the photosensitive layer K is the thermoplastic film P which is to receive the electrostatic image. Interposed between the film P and the photosensitive sheet K is the charge-transfer solution T. As is well known when a voltage is applied across the conductive layers $S_1$ and $S_2$, a potential image is formed by static electricity. Thus, as may be seen from FIG. 3, the object at the right is focussed by the schematically represented objective onto the film P, with the shutter 4 which is schematically represented being shown in FIG. 3 in its open position. The opening of the shutter 4 will act through a switch 9 to close the circuit of a source of power 24, so that the potential will be applied across the layers $S_1$, $S_2$. This will result in electrostatically imaging the object on the thermoplastic film P.

A camera of this type thus develops an electrical charge only when a voltage is applied between the layers $S_1$ and $S_2$, so that the desired exposure may be determined by setting the duration of voltage application in accordance with the intensity of the light which is received from the object which is photographed. However, in the event that the photosensitive layer or sheet K is exposed to a relatively intense light for long duration, a deleterious effect on the exposure is possible, and in order to avoid this an auxiliary shutter, such as the shutter 4 is usually required so as to interrupt the travel of light from the object which is photographed and thus prevent impingement of this light on the photosensitive sheet K so as to avoid the undesirable effect which otherwise might occur.

Figure 1:
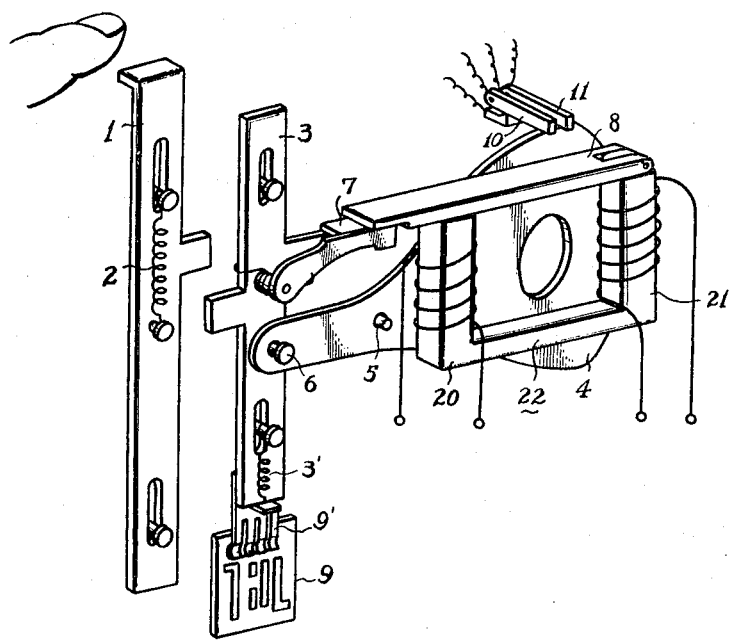
FIG. 1 is a schematic perspective illustration of important components of the invention.

Referring now to FIG. 1, a manually operable means is provided for displacing the shutter means 4 from the closed position which it normally assumes to an open position in order to start an exposure. This manually operable means includes a manually depressible plunger 1 urged upwardly to a rest position by a spring 2. This plunger has a lateral extension situated over a lateral extension of a second depressible component 3 of the manually operable means, so that in response to downward movement of element 1 the element 3 also will move downwardly. A spring 3' acts to return the element 3 upwardly to its rest position, and for the purposes of illustration element 3 is shown in FIG. 1 at a location displaced part of the way down from its upper rest position.

The auxiliary shutter which is formed by the shutter means 4 is situated in the path of the light traveling from the object through the objective, as pointed out above. This shutter 4 takes the form of a plate of opaque material formed with an opening through which the optical axis passes when the shutter is in its open position. The plate 4 is supported for swinging movement on a pin 5 and is connected by a pivot 6 to the component 3. When the component 3 is in its upper rest position the shutter 4 is displaced in a clockwise direction from the position of FIG. 1 to its closed position which it normally assumes.

The component 3 has a laterally projecting portion 7 which may act as a locking element, and this element 7 is overlapped at its free end by a yoke 8 which forms part of a transformer 22. The yoke 8 is supported for swinging movement at its right end, as viewed in FIG. 1, so that during movement of element 3 downwardly, as viewed in FIG. 1, the yoke 8 has swung in a counterclockwise direction until it engages the left limb of the transformer 22, thus closing the core of the transformer and placing it in an operative condition.

The left limb of the transformer 22, as viewed in FIG. 1, forms a primary thereof and has a coil 20 which when energized functions as an electromagnet to attract the yoke 8, which functions as an armature, so as to maintain the yoke 8 in engagement with the left limb of the transformer, and in this way the yoke 8 coacts with the projection 7 to form a releasable holding means for releasably holding element 3 and thus the shutter means 4 in its open position.

Electrical circuitry which is described below and includes synchronized switches 10 and 11 which are schematically represented in FIG. 1. These switches normally assume closed positions, but when the shutter 4 is swung in a counterclockwise direction, as viewed in FIG. 1, to its open position, it automatically opens the switches 10 and 11 for a purpose referred to below. Thus, when the shutter means 4 is in its closed position the switches 10 and 11 are closed while when the shutter means 4 assumes its open position the switches 10 and 11 are opened in synchronism with the opening of the shutter.

Figure 2:
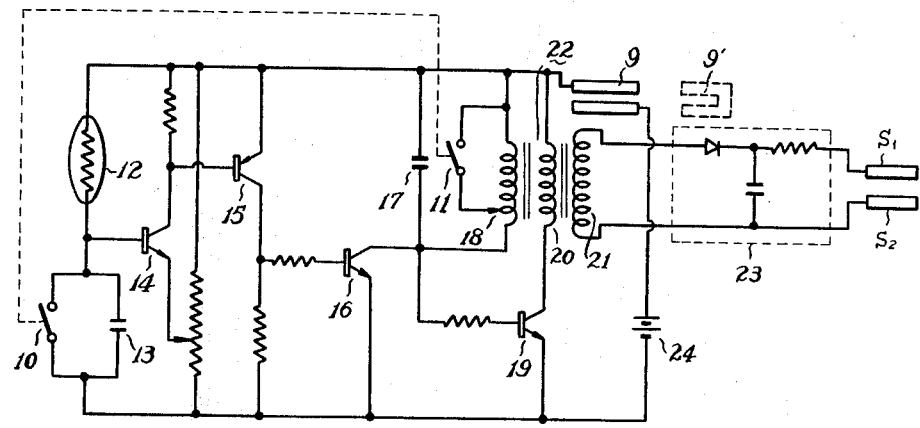
FIG. 2 is a wiring diagram of a circuit used with the structure of the invention.

Referring now to FIG. 2, the control means which coacts with the structure of FIGS. 1 and 3 includes a photosensitive means 12 which receives the light from the object so as to respond to the intensity thereof. This photosensitive means 12 is connected in series with a timing capacitor 13 so as to form a timing circuit therewith. The synchronized switch 10 in its closed position bypasses the capacitor 13, so that this capacitor 13 will only become operative upon opening of the switch 10.

The control means of FIG. 2 further includes an oscillating circuit which has a triggering transistor 14 the base of which is connected to the junction between the photosensitive means 12 and the capacitor 13. Thus, a terminal voltage of the capacitor 13 is applied to the base of the transistor 14 to act as the triggering voltage.

The oscillating circuit has an oscillating transistor 19 connected with an LC oscillating circuit including a coil 18 which is connected in parallel with a capacitor 17 of the latter circuit. The second synchronized switch 11 is connected across a coil 18 so as to render the latter operative also only upon opening of the shutter. The coil 18 and capacitor 17 are connected to the output of the triggering transistor 14, and this output is thus used as a base bias through the switching transistors 15 and 16 of the oscillating circuit, the latter transistors being connected one after the other subsequent to the triggering transistor 14.

The transformer 22 has its secondary coil 21 which is of a higher voltage, the transformer being a step-up transformer, applying its output to the conductive layers $S_1$ and $S_2$ through a rectifier circuit 23, the connection being made to the positive pole of the transparent conductive layer $S_1$ and to the negative pole of the aluminum conductive layer $S_2$. The primary coil 20 is connected in series with the collector of the oscillating transistor 19.

With the above-described structure of the invention, when the manually operable means is actuated by manual depression of plunger 1, the component 3 of the manually operable means also is depressed as described above. This will permit the yoke 8 to swing down to its operative position, and at the same time a sliding contact 9' of the switch 9 will be displaced into engagement with the stationary contact thereof so that the switch 9 becomes closed, thus closing the circuit of the power source 24. Before the shutter reaches its open position, the circuit is thus closed, and just prior to opening of the shutter the transistors 14, 15 and 16 are in a non-conductive state while the oscillating transistor 19 is in its operative state where it conducts and thus energizes the transformer 22. Therefore, further depression of the manually operable means 3 will continue to turn the shutter 4 so that it reaches its open position where light travels through the aperture thereof to commence the exposure, and simultaneously switches 10 and 11 are opened.

Now the timing capacitor will start to be charged with the photoconductive current under the control of the photosensitive conductor 12 on which the light impinges. The oscillating coil 18 will gain a sufficient reactance so that the oscillating transistor 19 operates at a frequency depending upon the capacitance of the capacitor 17. The transformer 22 which has the output of the oscillating transistor 19 applied to its primary coil therefore acts as an electromagnet to attract the yoke 8 and the rectified output of the secondary coil 21 is applied across the conductors $S_1$ and $S_2$. As a result the exposure by the electrostatic charge transfer is initiated, and at this time the attraction of yoke 8 to the left limb of the transformer, as viewed in FIG. 1, enables the left free end of the yoke 8 to coact with the projection 7 to form a releasable holding means releasably retaining the shutter means 4 in its open position as long as the transformer remains energized. Thus, at this time the locking piece 7 of component 3 is locked by yoke 8 due to the attraction of the latter to the remainder of the transformer. The circuit therefore remains operative while time elapses during which the exposure is made.

During this exposure time, the terminal voltage of the timing capacitor 13 rises until it reaches the triggering voltage for the triggering transistor 14, and at this instant the transistor 14 will assume its conductive state, rendering the subsequent transistors 15 and 16 also conductive and placing the transistor 19 in its blocking or non-conductive state as a result of the application of the output of the transistor 14 to the base of the oscillating transistor 19. As a result the transistor 19 is biased and ceases to oscillate. Therefore, at this instant the secondary output of the transformer 22 is interrupted and the exposure is completed. In other words, the transformer 22 becomes deenergized, so that the attractive force on the yoke 8 ceases. Thus, the spring 3' can now act to return the component 3 to its rest position, since the releasable holding means 7, 8 is now released by the deenergizing of the transformer. The return of the manually operable means to its rest position will also result in return of the shutter means 4 to its closed position which it normally assumes, so that the path of light to the film is interrupted. At the same time the synchronized switches 10 and 11 are closed and the switch 9 opens, so that all of the parts assume their initial positions.

Thus, with the structure described above, the auxiliary shutter 4 is displaced to its open position just prior to exposure, or in other words just prior to the moment when voltage is applied across the photosensitive sheet K and the dielectric film, while the shutter means on the other hand is closed immediately upon completion of the exposure under control of the timing value adjusted by the timing circuit in accordance with the intensity of the light traveling from the object which is to be photographed, so that in this way any possible deleterious preliminary effect is avoided and photographing by the charge transfer process is carried out with a proper exposure. It is furthermore to be noted that the apparatus of the invention as described above is of practical advantage in that all that is required is manual operation in connection with tripping of the shutter to start an exposure, with all of the remaining controls taking place automatically by the mechanically operative section which includes the shutter means and the circuitry described above. The releasable holding means formed by components 7, 8 serve to releasably hold the shutter means in its open position until the exposure is completed. Thus an exceedingly effective exposure control is achieved with a relatively small number of inexpensive components which operate very reliably.

What is claimed is:

1. In a camera, imaging means for electrostatically imaging an object, auxiliary shutter means having an open position for rendering said imaging means operative to make an exposure and a closed position for prevening said imaging means from making an exposure, manually operable means coacting with said shutter means for displacing the latter from said closed to said open position to commence an exposure, said shutter means normally assuming its closed position, releasable holding means coacting with said shutter means for releasably holding the latter in its open position in opposition to its tendency to assume its closed position, and control means coacting with said releasable holding means for actuating the latter to release said shutter means for return to its closed position after a film which receives an image electrostatically has been properly exposed, said control means including a photosensitive means for responding to light intensity and an electrical circuit coacting with said photosensitive means for automatically actuating said holding means to release said shutter means after an exposure time has elapsed which is proper for the film and the light intensity sensed by said photosensitive means, said electrical circuit including a capacitor connected in series with said photosensitive means and forming a timing circuit therewith, and an oscillating circuit operatively connected with said timing circuit to be triggered thereby for terminating the exposure, and a transformer having primary and secondary windings, said oscillating circuit having an output connected to said primary winding and said secondary winding being operatively connected with said imaging means.

2. In a camera, imaging means for electrostatically imaging an object, auxiliary shutter means having an open position for rendering said imaging means operative to make an exposure and a closed position for preventing said imaging means from making an exposure, manually operable means coacting with said shutter means for displacing the latter from said closed to said open position to commence an exposure, said shutter means normally assuming its closed position, releasable holding means coacting with said shutter means for releasably holding the latter in its open position in opposition to its tendency to assume its closed position, and control means coacting with said releasable holding means for actuating the latter to release said shutter means for return to its closed position after a film which receives an image electrostatically has been properly exposed, said control means including a photosensitive means for responding to light intensity and an electrical circuit coacting with said photosensitive means for automatically actuating said holding means to release said shutter means after an exposure time has elapsed which is proper for the film and the light intensity sensed by said photosensitive means, said electrical circuit including a capacitor connected in series with said photosensitive means and forming a timing circuit therewith, and an oscillating circuit operatively connected with said timing circuit to be triggered thereby for terminating the exposure, said circuit including a switch means actuated by said shutter means for starting the operation of said oscillating circuit and for rendering said capacitor operative to coact with said photosensitive means when said shutter means reaches said open position thereof, a pair of conductive layers forming part of the imaging means for electrostatically imaging an object on the film, said circuit including a secondary winding of a transformer operatively connected with said layers, and said oscillating circuit coacting with a primary winding of said transformer, said transformer including a yoke portion movable to and from a given operative position closing a core of said transformer and said manually operable means placing said yoke portion in said operative position thereof simultaneously with displacement of said shutter means to said open position.

3. The combination of claim 2 and wherein the transformer acts electromagnetically upon said yoke portion to retain the latter in its operating position as long as said transformer is energized by said oscillating circuit, and said yoke portion acting through said manually operable means on said shutter means to maintain the latter in its open position as long as said yoke portion is in its operative position, so that when the transformer is deenergized upon triggering of said oscillating circuit by said timing circuit, said yoke portion is free to be displaced away from its operative position and said shutter is released for returning to its closed position, said yoke portion forming part of said releasable holding means.

4. The combination of claim 3 and wherein said releasable holding means includes in addition to said yoke portion a manually displaceable member operatively connected with said shutter means and having a projecting portion held by said yoke portion in a given holding position as long as said yoke portion remains in its operative position.

5. In a camera, imaging means for electrostatically imaging an object, auxiliary shutter means having an open position for rendering said imaging means operative to make an exposure and a closed position for preventing said imaging means from making an exposure, manually operable means coacting with said shutter means for displacing the latter from said closed to said open position to commence an exposure, said shutter means normally assuming its closed position, releasable holding means coacting with said shutter means for releasably holding the latter in its open position in opposition to its tendency to assume its closed position, and control means coacting with said releasable holding means for actuating the latter to release said shutter means for return to its closed position after a film which receives an image electrostatically has been properly exposed, said imaging means for electrostatically imaging an object on film including a pair of conductive layers, said control means including an electrical circuit having a transformer provided with a secondary winding and a rectifier through which said secondary winding is operatively connected with said conductive layers, an oscillating circuit operatively connected with a primary winding of the transformer, and a timing circuit operatively connected with said oscillating circuit and including a timing capacitor and a photosensitive means for sensing the intensity of light from the object which is imaged, switch means coacting with said oscillating circuit and timing capacitor for rendering both of them operative only when said shutter means reaches said open position thereof, and said releasable holding means including a part of said transformer acted upon by said manually operable means for placing said transformer in an operative position only when said shutter means is displaced to its open position by said manually operable means, said oscillating circuit when triggered by said timing circuit terminating the operation of the transformer to release through said part of said transformer said shutter means for return to its closed position.

* * * * *